United States Patent [19]

Glesius et al.

[11] Patent Number: 4,623,508

[45] Date of Patent: Nov. 18, 1986

[54] WIDE RANGE FLUX MONITOR ASSEMBLY

[75] Inventors: Frederick L. Glesius, Shaker Heights; John C. Kroon, Chagrin Falls; Donald A. Schneider, Lakewood, all of Ohio; Arne L. Myrabo, Monticello, Minn.

[73] Assignee: Reuter-Stokes, Inc., Twinsburg, Ohio

[21] Appl. No.: 580,480

[22] Filed: Feb. 15, 1984

[51] Int. Cl.[4] .......................................... G21C 17/00
[52] U.S. Cl. .................................. 376/254; 376/154; 376/258; 250/390
[58] Field of Search ............... 376/154, 254, 255, 258, 376/259, 247; 250/390-392

[56] References Cited

U.S. PATENT DOCUMENTS

| | | | |
|---|---|---|---|
| 3,311,770 | 3/1967 | Boyd | 376/154 |
| 4,298,430 | 11/1981 | Rolstad et al. | 376/247 |
| 4,343,994 | 8/1982 | Farcy | 250/390 |
| 4,393,307 | 7/1983 | Nozaki et al. | 250/390 |
| 4,406,011 | 9/1983 | Burns | 376/247 |
| 4,493,811 | 1/1985 | Seki et al. | 376/259 |
| 4,495,144 | 1/1985 | Lingren et al. | 376/259 |

FOREIGN PATENT DOCUMENTS 1904407 9/1970 Fed. Rep. of Germany ...... 376/255

OTHER PUBLICATIONS

IEEE Trans. on Nuc. Sci., vol. NS-28, No. 1 (2/81), Wycoff et al., pp. 745-748, "Design, Development and Installation of a Wide Range Fission Chamber System, A Summary".

Primary Examiner—Salvatore Cangialosi
Attorney, Agent, or Firm—Fay, Sharpe, Fagan, Minnich & McKee

[57] ABSTRACT

A wide range flux monitoring assembly is provided for in-core neutron flux monitoring in a nuclear reactor vessel. The assembly comprises a fixed in-core power range monitor and a fixed in-core extended range start-up monitor which are connected to signal processing circuitry means for generating signals representative of neutron flux in the reactor vessel. The extended range start-up monitor includes a fission chamber including an anode, a cathode, a neutron sensitive material interposed between the anode and the cathode and a cable assembly for communicating electrical signals between the anode and the cathode to the signal processing circuitry means. An insulating oversheath is disposed about the extended range start-up monitor for insulating the fission chamber from reactor vessel potential. The oversheath comprises a casing having an inner wall and an outer wall and includes an insulating layer interposed between the fission chamber and the inner wall. The insulating layer preferably comprises aluminum oxide. The insulating material is intimately fit to the ion chamber assembly whereby thermal resistance is minimized between the ion chamber and the oversheath to provide a good heat flow out of the chamber assembly.

13 Claims, 5 Drawing Figures

WIDE RANGE FLUX MONITOR ASSEMBLY

BACKGROUND OF THE INVENTION

This invention pertains to the art of nuclear reactor control instrumentation systems and particularly control systems for boiling water reactors.

The invention is more particularly applicable to a wide range flux monitor assembly including an extended range start-up monitor and a power range monitor for monitoring neutron flux over a wide reactor power range. However, it will be appreciated to those skilled in the art that the invention could be readily adapted for use in other environments as, for example, where similar monitoring assemblies are employed to monitor radiation.

Conventional neutron monitoring devices and detection systems have employed a variety of different neutron detectors to cover the entire range of neutron flux levels for light-water-cooled nuclear power plants. For high neutron flux levels, fission chambers comprising direct current operation mode ionization detectors have been utilized, while for low neutron flux levels, a proportional counter detector operated in the pulse mode has been employed.

In response to the accident at Three Mile Island new requirements for instrumentation for light-water-cooled nuclear power plants have been promulgated in Regulatory Guide 1.97 (Rev. 2) of the Nuclear Regulatory Commission. A major objective of these requirements is to ensure the quality and reliability of plant status information available to control room operating personnel both during and after an accident. Thus, in the Guide certain plant variables and systems are identified as essential to the execution of a prompt shutdown and to the verification of the effective operation of plant safety systems. Requirements for instrumentation channels which monitor these key variables are framed to reflect the importance to safety of the measured variables and the need to survive the increased stress of the accident environment. It is imperative that the instrumentation operate in the most severe conditions produced by an accident and for an adequate length of time afterwards. Furthermore, the range of measurement must be wide enough that the instrument is on scale at all times, even under abnormal conditions.

The Guide calls for the measurement of neutron flux as a key variable in monitoring the status of reactivity control. It has been designated as Type B, Category 1, with a range of measurement of $10^{-6}\%$ to 100% of full power. In the classification scheme of the guide, a Type B variable is one which provides information to indicate whether plant safety functions are being accomplished. Category 1 denotes the most stringent design and qualification criteria, in accordance with Regulatory Guide 1.89, "Qualification of Class 1E Equipment for Nuclear Power Plants" and Regulatory Guide 1.100, "Seismic Qualification of Electrical Equipment for Nuclear Power Plants."

Since conventional light water reactors are already instrumented with highly developed and sophisticated neutron monitoring systems, it is natural to examine the possibility that they might satisfy the guide requirements presently or with some limited modifications. In fact, the conventional neutron monitoring systems in both Pressurized Water Reactors (PWR) and Boiling Water Reactors (BWR) exceed the range of performance needed. However, the level of qualification for such typical systems does not meet the requirements of Category 1.

In the case of PWR's the trend is to install new, qualified, out of core channels based on high sensitivity fission chambers. For BWR's the leakage neutron flux is quite low outside of the biological shield where ex-core detectors might be located. It is questionable whether detectors placed ex-core could provide the necessary sensitivity to cover the lower flux range. The preferred location for the BWR post-accident neutron flux monitoring detectors is in-core where the normal flux monitoring instrumentation resides.

The flux monitoring instrumentation for a typical BWR cover a range of $10^3$ nv to $2 \times 10^{14}$ nv using three subsystems:

(1) Retractable Source Range Monitor (SRM)
(2) Retractable Intermediate Range Monitor (IRM)
(3) Fixed Power Range Monitor (PRM)

The detectors in each of these subsystems are miniature fission chambers containing $U^{235}$ as the sensitive material. The SRM and the IRM detectors are retracted out of the core during full power operation to minimize burn-up of the sensitive material and prolong life. The rack and pinion drive mechanisms for moving the detectors are located below the reactor vessel. The task of qualifying a complex movable detector system to Category 1 was judged to be a formidable one. In addition, because of the relationship of this instrumentation to the Reactor Protection System, any modifications could entail extensive re-analysis of existing safety systems. These considerations provided an incentive to find another approach to the wide range flux measurement.

Known PRM detectors have employed a regenerative $U^{234}$, $U^{235}$ coating as the sensitive material to extend the detector life at full power flux. However, the amount of such coating which is applied to a PRM detector for successful operation precludes use of a conventional PRM detector as a reliable SRM or IRM detector. A PRM detector is simply not sensitive enough for source or intermediate range monitoring.

The present invention contemplates a new and improved wide range flux monitor assembly including a fixed in-core extended range start-up monitor for source and intermediate range monitoring and a fixed in-core power range monitor for power range monitoring. The invention overcomes all of the above referred to problems and others to provide a new neutron monitor assembly which may monitor source, intermediate and power range operation of a nuclear reactor while remaining in-core during full range of power operation, is simple in design, economical to manufacture, provides reliable neutron monitoring over a wide range of neutron radiation without a complicated insertion and retraction system and is compatible with pre-existing conventional neutron monitoring systems in BWR reactor assemblies.

BRIEF SUMMARY OF THE INVENTION

In accordance with the present invention, there is provided a wide range flux monitoring assembly for neutron flux monitoring in a nuclear reactor vessel comprising a power range monitor and an extened range start-up monitor which are connected to signal processing circuitry means for generating signals representative of neutron flux in the reactor vessel. The extended range start-up monitor includes a fission chamber including an anode, a cathode, a neutron sensitive material interposed between the anode and the cathode and a cable assembly for communicating electric potential between the anode and the cathode to the signal processing circuitry means. An insulating oversheath is disposed about the extended range start-up monitor for insulating the fission chamber from reactor vessel potential. The oversheath comprises a casing having an inner wall and an outer wall and includes an insulating layer interposed between the fission chamber and the inner wall. The insulating layer preferably comprises aluminum oxide. The neutron sensitive material preferably comprises a mixture of $U^{234}$ and $U^{235}$ isotopes to comprise a regenerative coating. The insulating material' is intimately fit to the ion chamber assembly whereby thermal resistance is minimized between the ion chamber assembly and the oversheath to provide a good heat flow out of the chamber assembly. The oversheath is in electrical communication with the reactor vessel and the fission chamber is electrically separated from the reactor vessel. The fission chamber is in electrical communication with an instrument ground potential of the signal processing circuitry means.

In accordance with another aspect of the present invention, the extended range start-up monitor detects neutron flux at least within the range of $10^4$ nv to $10^{13}$ nv ($10^{-8}\%$ to 10% full power) and the power range monitor detects neutron flux within the range of $10^{12}$ nv to $10^{14}$ nv (1% to 100% full power).

In accordance with yet another aspect of the present invention, an inadequate core coolant monitor assembly for a reactor vessel including coolant is provided comprising a plurality of fission detectors axially spaced in the reactor vessel core contiguous to the coolant. Each of the detectors includes means for generating signals representative of neutron flux. Signal processing means are provided for processing the signals from the detectors to recognize absence of coolant contiguous to any one of the detectors.

One benefit obtained by use of the present invention is a wide range flux monitor assembly for monitoring neutron flux over a wide range of reactor power levels in compliance with Regulatory Guide 1.97 (Rev. 2) of the NRC.

Another benefit obtained from the present invention is a wide range flux monitor assembly which is compatible with existing conventional neutron flux monitoring assemblies.

Yet another benefit of the present invention is a wide range flux monitor assembly which includes an intermediate and source range monitor that may remain fixed in-core during power range operation.

Yet another benefit of the present invention is a monitor assembly which monitors a reactor vessel core against inadequate coolant.

Other benefits and advantages of the subject new wide range flux monitor assembly will become apparent to those skilled in the art upon a reading and understanding of this specification.

BRIEF DESCRIPTION OF THE DRAWINGS

The invention may take physical form in certain parts and arrangements of parts, the preferred embodiment of which will be described in detail in this specification and illustrated in the accompanying drawings which form a part hereof and wherein.

DETAILED DESCRIPTION OF THE INVENTION

Figure 1:
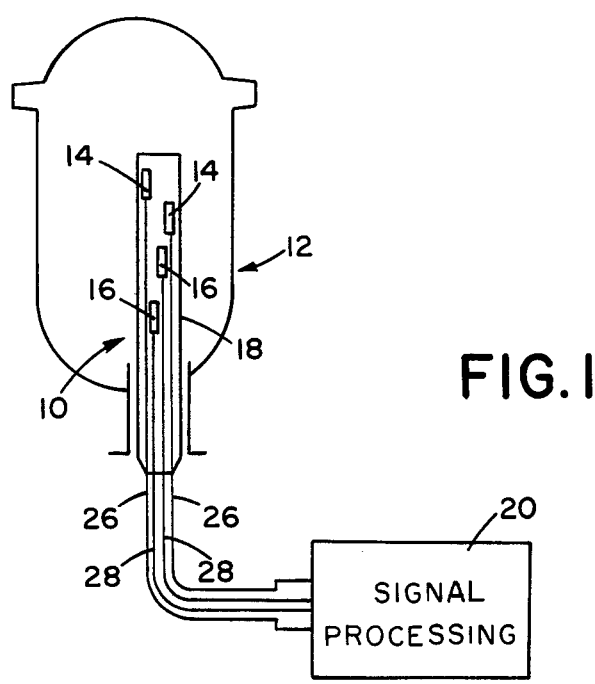
FIG. 1 is a schematic cross-sectional view of a reactor vessel formed in accordance with the present invention showing the neutron flux monitor assembly in position in core.

Referring now to the drawings wherein the showings are for purposes of illustrating the preferred embodiment of the invention only and not for purposes of limiting same, the Figures show a wide range flux monitor assembly 10 for neutron flux monitoring of a nuclear reactor including a nuclear reactor vessel 12. With particular reference to FIG. 1, the wide range flux monitor assembly 10 is comprised of a plurality of detectors or monitors 14, 16 received in an overall monitor casing 18 and associated signal processing circuitry means 20.

Figure 2:
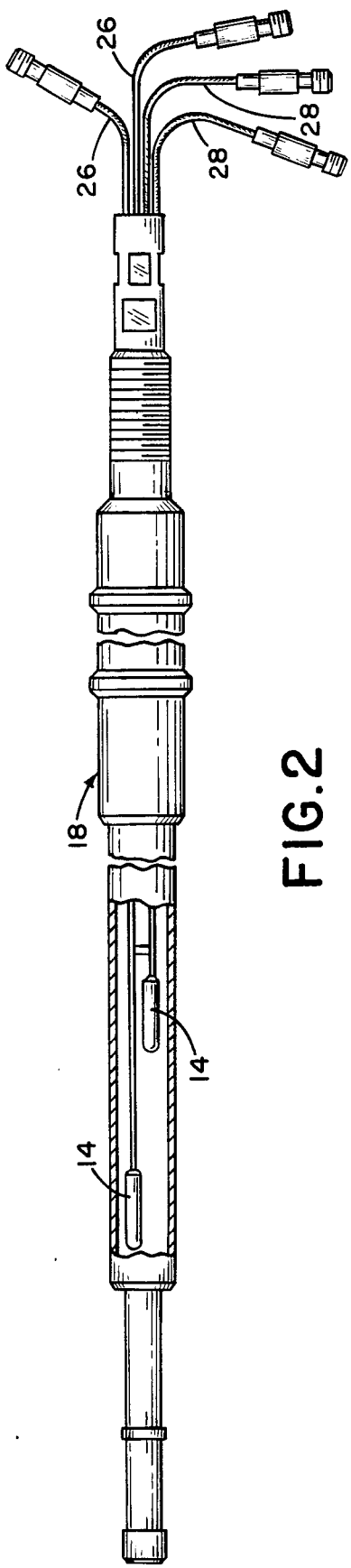
FIG. 2 is an elevated view in partial section in cross section of a flux monitor assembly formed in accordance with the present invention.

More specifically and with reference to FIGS. 1 and 2, the monitor casing 18 includes a plurality of monitors 14, 16 for monitoring neutron flux during operation of the reactor. The casing is inserted within the reactor vessel such that the monitors 14, 16 are disposed in the reactor core contiguous to the radioactive fuel. It is a particular feature of the invention that the casing 18 and monitors 14, 16 may remain fixed in-core during power range operation of the reactor. There is no need to withdraw any of the monitors 14, 16 during power range operation of the reactor such as was necessary with conventional source and intermediate range monitors. The casing is preferably constructed out of 304 stainless steel. The monitors 14, 16 are axially spaced within the casing 18 in a conventional manner such as is illustrated in U.S. Pat. No. 3,043,954 to Boyd et al. Each of the monitors 14, 16 is electrically separated for distinct processing of signals generated by them. Coaxial cables 26, 28 associated with each of the monitors are in operative communication with the monitors 14, 16 and extend from the casing 18 to maintain communication with the signal processing instrumentation.

The overall monitor casing 18 preferably includes four neutron monitors or detectors. Two of the monitors 14 comprise extended range start-up monitors for monitoring neutron flux during the reactor start-up and intermediate power range operation. The remaining two monitors 16 comprise power range monitors for monitoring neutron flux during power range operation of the reactor. Preferably the extended range start-up monitors 14 (ERSM) are positioned above the core midplane, while the power range monitors 16 (PRM) are disposed below the core midplane.

Figure 3:
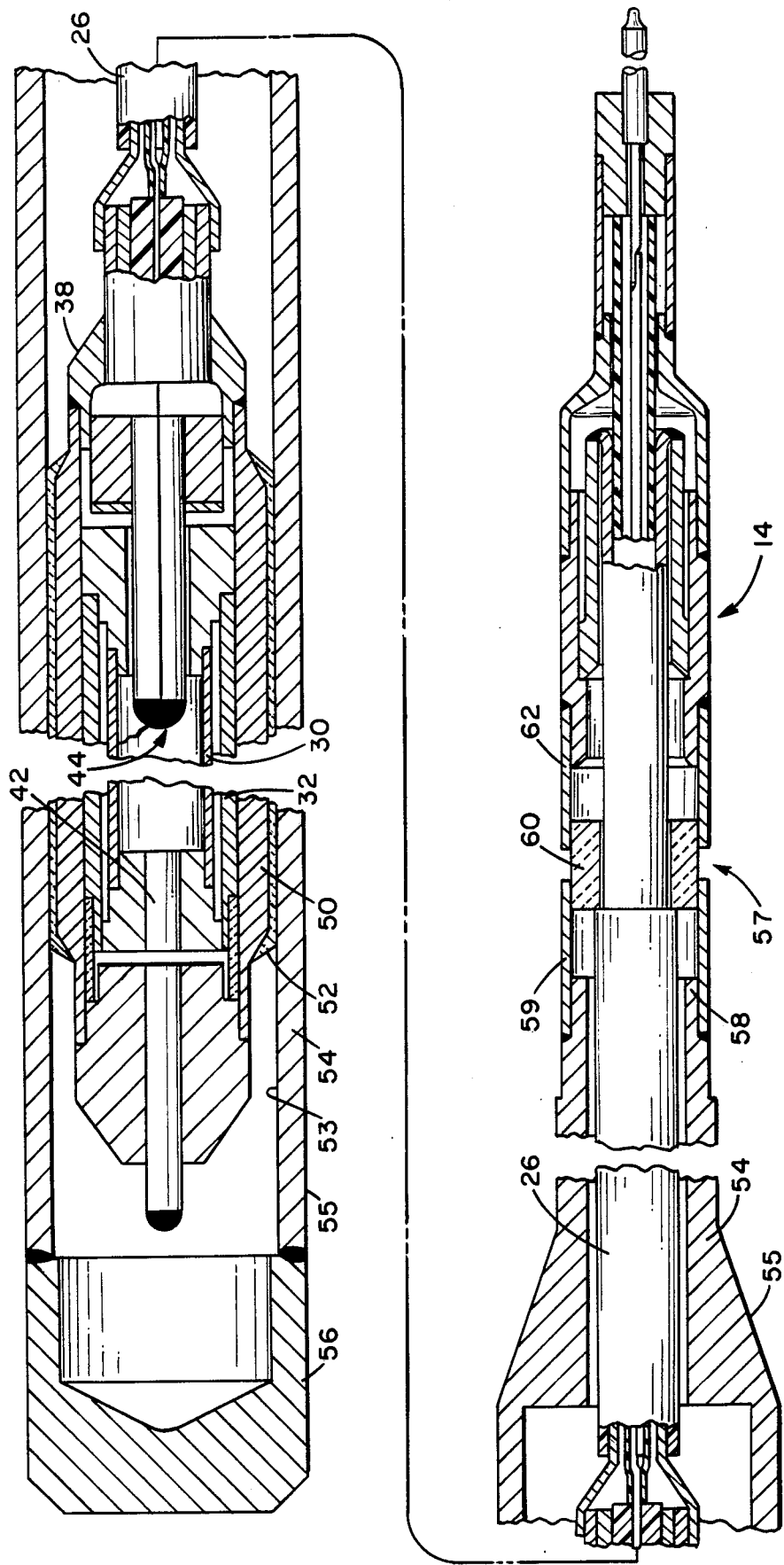
FIG. 3 is a cross-sectional view in partial section of an extended range start-up monitor for monitoring source and intermediate range neutron flux which is formed in accordance with the present invention.

With particular reference to FIG. 3 an ERSM assembly is illustrated. The monitor 14 generally comprises an ion or fission chamber whose principles of operation are well known in the art. Basically, the chamber is essentially a pair of electrodes comprising an anode 30 and cathode 32 separated by a gas chamber, preferably including argon. The cathode includes a surface coating of a neutron sensitive material which upon sensing of neutron flux causes a current pulse to occur between the anode and cathode. The neutron sensitive material preferably comprises $U^{235}$ or where a regenerative coating is advantageous a mixture of the isotopes $U^{234}$ and $U^{235}$. A potential is maintained between the anode and cathode such that when incident neutrons produce fission reactions in the coating, the resulting fission fragments ionize the gas between the electrodes and the electrons are swept out of the gap by the electric field. The electron motion induces a current pulse in the signal processing circuit which is subsequently detected and counted. Constructions of such a neutron sensitive ion chamber as well as the referenced neutron sensitive material coatings are known in the art.

The monitors 14 comprising an ERSM and the monitors 16 comprising a PRM each preferably have a neutron sensitive material coating of the same chemical composition. The composition is a regenerative coating of approximately 20% $U^{235}$ and 80% $U^{234}$. However, since the ERSM must be much more sensitive to sense neutron flux levels during start-up and intermediate power range operation, it includes approximately seven times as much coating as the PRM.

A ceramic to metal seal 38 hermetically seals the ion chamber. A mineral insulated coaxial cable 26 typically having an outer jacket of silicon dioxide ($SiO_2$) communicates the signal from the ion chamber connector to the signal processing instrumentation. Channel 42 is provided to fill the ion chamber with argon. A bias voltage is applied to the anode 30 through electrical connection and braze 44.

A first monitor housing 50 contains the ion chamber and is in electrical communication to the cathode 32. First monitor casing 50 has a generally cylindrical overall configuration and is circumscribed by an insulation layer 52 and a similarly cylindrical oversheath housing 54. The housing 54 has an inner wall 53 adjacent to the insulation layer 52 and an outer wall 55 in electrical communication to reactor vessel ground through the overall monitor casing 18 (FIG. 2). Insulation layer 52 preferably comprises aluminum oxide ($Al_2O_3$) and electrically insulates the first monitor casing against the oversheath housing 54. The oversheath housing 54 is in electrical communication with reactor ground and ambient ground currents. An end cap 56 is welded to the oversheathing housing 54 to seal the assembly. The insulating layer 52 and oversheath 54 operate to provide improved sensitivity of the ion chamber by insulating the chamber against the reactor vessel ground to thereby provide improved sensitivity during start-up and intermediate power range monitoring.

The insulating layer 52 is typically flame sprayed to the monitor casing 50. Thereafter it is ground and polished such that it is intimately fit against the oversheath inner wall 53. Although it is necessary to electrically isolate the oversheath 54 from the casing 50, it is also advantageous to minimize thermal resistance between the ion chamber and the oversheath to provide a good heat flow out of the assembly and ultimately out to the reactor coolant. Accordingly, the casing 50 and insulation layer 52 are closely received in the oversheath 54.

To further electrically isolate the oversheath 54 and reactor vessel ground from the signal processing circuitry, the oversheath is discontinuous towards the cable end 57 of the monitor 14. Specifically the oversheath 54 terminates at an end portion 58 which is sealed (such as by welding) to a first annulus 59. The first annulus 59 is thus exposed to reactor vessel ground potential. An insulation ring 60 constructed of aluminum oxide ($Al_2O_3$) electrically isolates the first annulus 59 from a second annulus 62. The second annulus 62 and the remaining outer wall portions of the monitor 14 which are in electrical communication with the annulus 62 are not exposed to reactor vessel ground. Rather the second annulus 62 is in electrical communication with instrument ground of the signal processing circuitry. Thus the oversheath 54 is discontinuous at insulation ring 60 to isolate reactor vessel ground from instrument ground.

Figure 5:
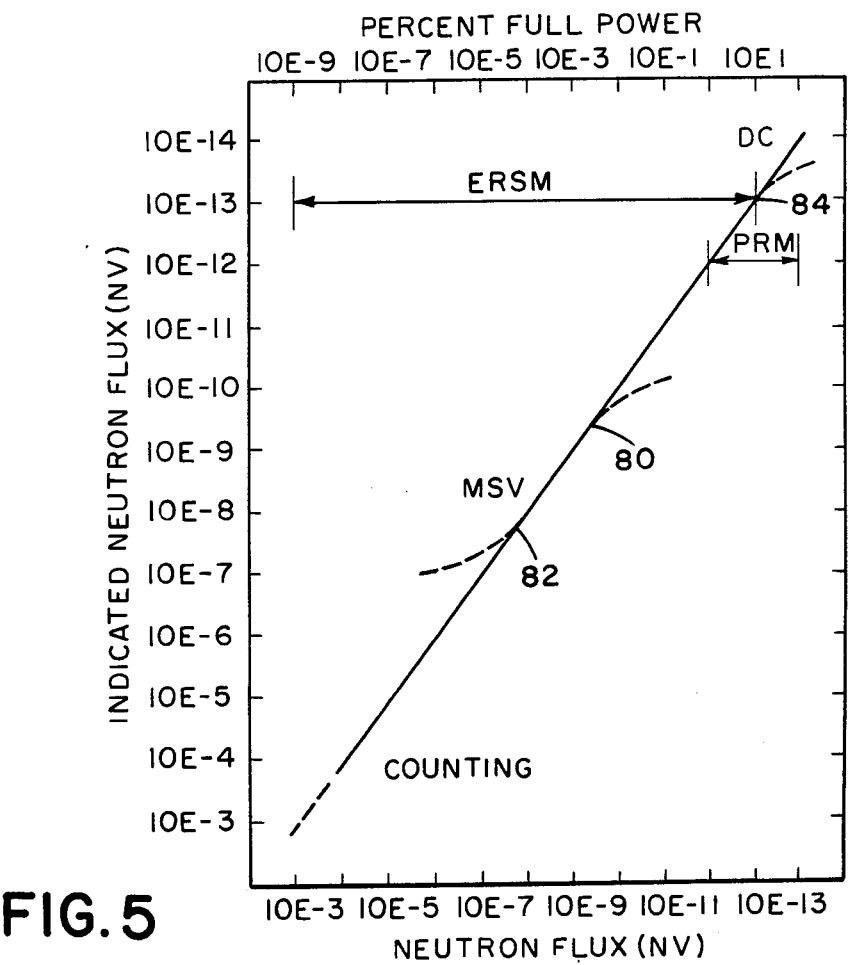
FIG. 5 is an experimentally determined graph illustrating a wide range channel output signal of a wide range flux monitor assembly formed in accordance with the present invention.
Figure 4:
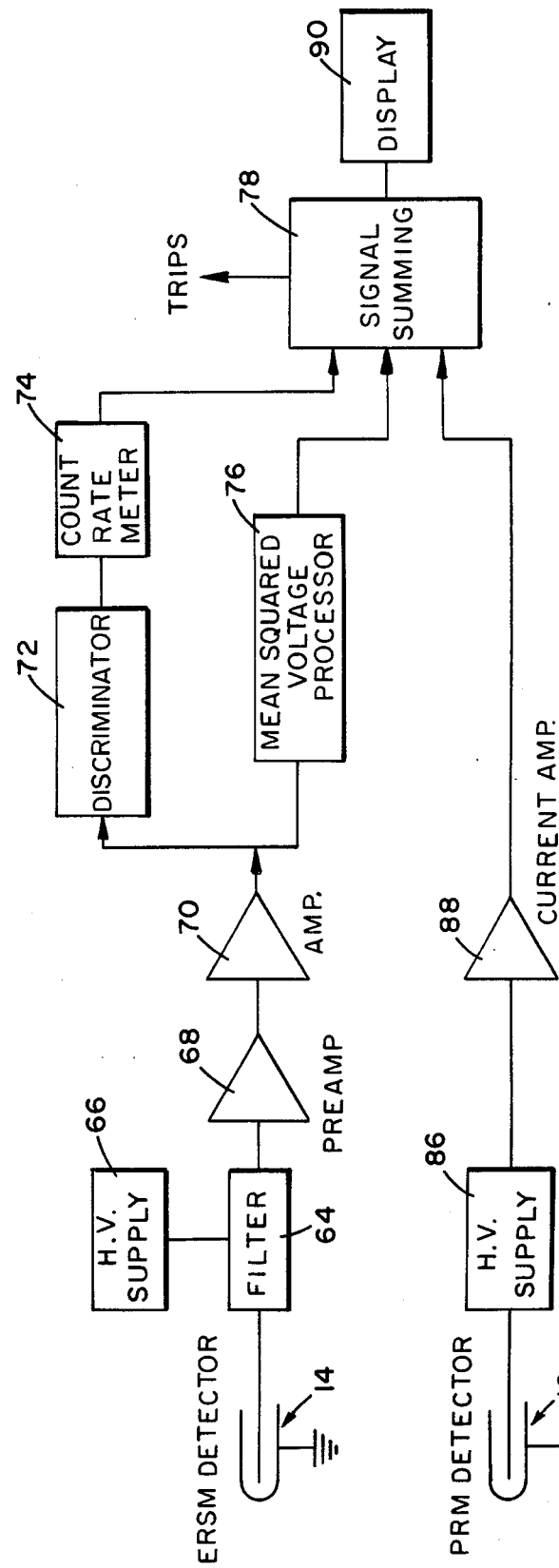
FIG. 4 is a block diagram of the signal processing means for processing signals from the flux monitor assembly.

With particular reference to FIGS. 4 and 5 the operation and output of the signal processing circuitry will be particularly discussed. The output signal from the ERSM detector 14 is communicated to a filter 64 which in turn is in communication with a high voltage power supply 66. The power supply 66 biases the detector 14. The filter 64 operates to remove any kind of signal noise that comes in from the high voltage power supply 66. The filter 64 basically comprises at least a load resistor for the detector 14 and a capacitor to decouple signals from the supply 66. Down line from the filter 64 is a preamp 68 whose input impedance effectively terminates the signal cable from the detector 14. Amplifier 70 represents in general more stages of amplification and band pass components which operate to place the detector signal in a better condition for signal reading. The output from the amplifier 70 is fed in parallel to two signal processing circuitry component assemblies. The first assembly comprises a discriminator 72 and a count rate meter 74. The second assembly comprises a mean squared voltage processor 76. Both assemblies feed a signal summing circuit which selects which of the respective output signals is appropriate for display.

With reference to FIG. 5 which illustrates an experimentally determined wide range channel output signal produced in accordance with the present invention, it may be seen that the ERSM provides a linear indication of neutron flux from $10^{-8}$% up to 10% of full power for the reactor. This represents a neutron flux ranging from $10^4$ nv to $10^{13}$ nv. The lowest levels of neutron flux, i.e., $10^4$ nv to $10^9$ nv may be detected by pulse counting by the discriminator 72 and count rate meter 74. At these low levels of neutron flux the signal processing circuitry can count the pulses generated by neutron impingement in the monitor ion chamber. As is indicated on the graphic of FIG. 5, a counting output is displayed by the signal summing circuitry 78 up to a point 80 at roughly $10^9$ nv or $10^{-3}$% of full power, after which point the counting signal becomes nonlinear as the discriminator 72 ultimately becomes saturated as the reactor reaches higher power levels. The output of the mean squared voltage processor 76 below point 82 on the graph of FIG. 5 provides an output signal which is nonlinear so that the signal summing circuit 78 ignores the output from the mean squared voltage processor 76 and displays the counting output. However, above the point 82, i.e., approximately $10^8$ nv or $10^{-4}$% of full power, the output of the mean squared voltage processor 76 is displayed by the signal summing circuit 78. The mean squared voltage processor provides a direct current output proportional to the mean squared voltage content of the signal from the detector 14. The output from the processor 76 is linear up to 10% of reactor power, as indicated at 84, then becomes nonlinear.

The output signal from the power range monitor 16 is generated by a high voltage supply 86 which biases the detector 16 and is amplified by amplifier 88 before being communicated to the signal summing circuit 78. The power range monitor 16 monitors neutron flux over the power range of operation of the reactor which is roughly 1 to 100% of power as is indicated on FIG. 5.

The signal summing circuit 78 is a conventional control system which identifies valid signals from the detectors and provides the proper output signal to a display 90 to an operator. In addition, the summing circuit 78 is capable of tripping an alarm signal when some safety barrier is threatened in the reactor vessel. For example, if the rate of change is too fast or the level of neutron radiation is too high, then the reactor plant protection system should be tripped.

Another feature of the present invention is that the assembly may be employed as an inadequate core coolant monitor whereby the ERSM monitors 14 which are axially spaced in the overall monitor casing 18 may detect changes in flux values indicative of inadequate coolant in the reactor vessel core. A signal processing means recognizes the absence of coolant contiguous to the monitor.

The invention has been described with reference to the preferred embodiment. Obviously, modifications and alterations will occur to others upon the reading and understanding of the specification. It is our intention to include all such modifications and alterations insofar as they come within the scope of the appended claims or the equivalents thereof.

Having thus described our invention, we now claim:

1. A wide range neutron flux monitor assembly for fixed in-core neutron monitoring in a nuclear reactor vessel comprising:
    a fixed in-core power range monitor;
    a fixed in-core extended range start-up monitor including a fission chamber and an insulating oversheath for insulating said fission chamber from reactor vessel potential, said oversheath being in electrical communication with the reactor vessel and said fission chamber being electrically separated from the reactor vessel; and,
    signal processing circuitry means for generating signals representative of neutron flux in the reactor vessel, said fission chamber being in electrical communication with an instrument ground potential of said signal processing circuitry means.

2. The monitor assembly as claimed in claim 1 wherein said oversheath comprises a casing having an inner wall and an outer wall and includes an insulating layer interposed between said fission chamber and said inner wall.

3. The monitor assembly as claimed in claim 2 wherein said insulating layer comprises aluminum oxide.

4. The monitor assembly as claimed in claim 1 wherein said fission chamber includes neutron sensitive material comprising a mixture of $U^{234}$ and $U^{235}$ isotopes.

5. An in-core wide range flux monitor assembly for boiling water reactors having a monitor range of $10^{-8}\%$ to 100% full power comprising:
    at least one source and intermediate range fission detector to detect neutron flux at least within the range of $10^{-8}\%$ to 10% of full power and to produce a source and intermediate range output signal representative thereof, said detector having an ion chamber and an insulating oversheath for insulating said ion chamber from reactor vessel potential, said oversheath being exposed to reactor ground potential and electrically isolated from instrument ground potential, an insulation ring being disposed adjacent said oversheath terminate end portion;
    at least one power range fission detector to detect neutron flux at least within the range of 1% to 100% of full power and to produce a power range output signal representative thereof, said power range fission detector including an insulating oversheath; and,
    means for processing the output signals whereby neutron flux may be monitored over a wide range of reactor power.

6. The monitor assembly as defined in claim 5 wherein said source and intermediate range fission detector detects neutron flux at least within the range of $10^4$ nv to $10^{13}$ nv and said power range fission detector detects neutron flux within the range of $10^{12}$ nv to $10^{14}$ nv.

7. The monitor assembly as defined in claim 5 wherein said fission detectors comprise an ion chamber including neutron sensitive material, said source and intermediate range fission detector having at least seven times more neutron sensitive material than said power range fission detector.

8. The monitor assembly as defined in claim 5 wherein said assembly includes two source and intermediate range fission detectors separated axially and disposed above reactor core midplane.

9. The monitor assembly as defined in claim 8 wherein said assembly includes two power range fission detectors separated axially and disposed below core midplane.

10. An extended range start-up monitor adapted to be disposed in-core in a nuclear reactor vessel comprising a fission detector sensitive to neutron flux having an ion chamber assembly including an anode, a cathode, a neutron sensitive material interposed between said anode and cathode and a cable assembly for communicating electric potential between said anode and cathode to signal processing means;
    said fission detector further including an insulating oversheath to insulate said ion chamber assembly from reactor vessel potential and an insulation ring disposed adjacent to a terminate end portion of the oversheath to electrically isolate the oversheath.

11. The monitor as defined in claim 10 wherein said oversheath includes an outer wall exposed to reactor vessel potential and an inner wall contiguous to said ion chamber assembly, said inner wall having an insulating material disposed thereon for electrical isolation of said oversheath to said ion chamber assembly.

12. The monitor as defined in claim 11 wherein said insulating material comprises a layer of flame spray electrical-insulate coating intimately fit to said ion chamber assembly whereby thermal resistance is minimized between said ion chamber assembly and said oversheath to provide a good heat flow out of the chamber assembly.

13. The monitor as defined in claim 12 wherein said flame spray electrical-insulate coating comprises polished aluminum oxide.

* * * * *